United States Patent [19]
Tate et al.

[11] 3,975,208
[45] Aug. 17, 1976

[54] METHOD OF SELECTIVELY RECOVERING VINYL HALIDE INSULATION FROM INSULATED WIRE SCRAP

[75] Inventors: Stanley L. Tate; Bobby A. Rowland, both of Carrollton, Ga.; Michael M. Blackstone, Jacksonville, Fla.

[73] Assignee: Southwire Company, Carrollton, Ga.

[22] Filed: Jan. 23, 1975

[21] Appl. No.: 543,559

Related U.S. Application Data

[63] Continuation-in-part of Ser. No. 407,396, Oct. 17, 1973, abandoned.

[52] U.S. Cl. .................................. 134/10; 134/12; 134/38
[51] Int. Cl.² .......................... B08B 3/08; B08B 7/04
[58] Field of Search ............... 134/10, 12, 25 R, 33, 134/38, 109, 110, 111, 2

[56] References Cited
UNITED STATES PATENTS

| | | | |
|---|---|---|---|
| 2,417,468 | 3/1947 | Canziani et al. | 134/38 X |
| 2,435,239 | 2/1948 | Schub | 134/38 X |
| 2,721,562 | 10/1955 | Irvine | 134/12 X |
| 3,441,368 | 4/1969 | Couche | 134/10 X |
| 3,619,295 | 11/1971 | Nishizaki et al. | 134/22 R |
| 3,624,009 | 11/1971 | Sussman | 134/38 X |
| 3,654,940 | 4/1972 | Ritzi | 134/38 X |
| 3,666,691 | 5/1972 | Spiller | 134/38 X |
| 3,764,384 | 10/1973 | Berni | 134/12 |
| R27,432 | 7/1972 | Torrenzano et al. | 134/12 |

FOREIGN PATENTS OR APPLICATIONS

617,788   4/1961   Canada

OTHER PUBLICATIONS

Chemical Abstracts; vol. 57, column 1075 b-c July 1962.
Chemical Abstracts; vol. 73, Nos. 19-21, p. 312, 1970; abstract No. 98167g.
Perry's Chemical Engineering Handbook; Fourth Edition; pp. 17-2; 17-3; Perry et al, McGraw Hill Book Company, N.Y. 1963.

Primary Examiner—S. Leon Bashore
Assistant Examiner—Steve Alvo
Attorney, Agent, or Firm—Van C. Wilks; Herbert M. Hanegan; Stanley L. Tate

[57] ABSTRACT

A process for selectively recovering vinyl halide insulation from mixed insulated wire scrap by selectively dissolving the vinyl halide insulation with a solvent at a temperature at which the solvent is a specific solvent for the vinyl halide and has no solvent effect upon other organic insulation material present in the mixed insulated wire scrap. The dissolved polyvinyl halide is recovered from solution in a dry granular state suitable for extrusion upon wire as insulation. The polyvinyl halide insulation is polyvinyl chloride, copolymers of polyvinyl chloride or mixtures thereof.

19 Claims, 1 Drawing Figure

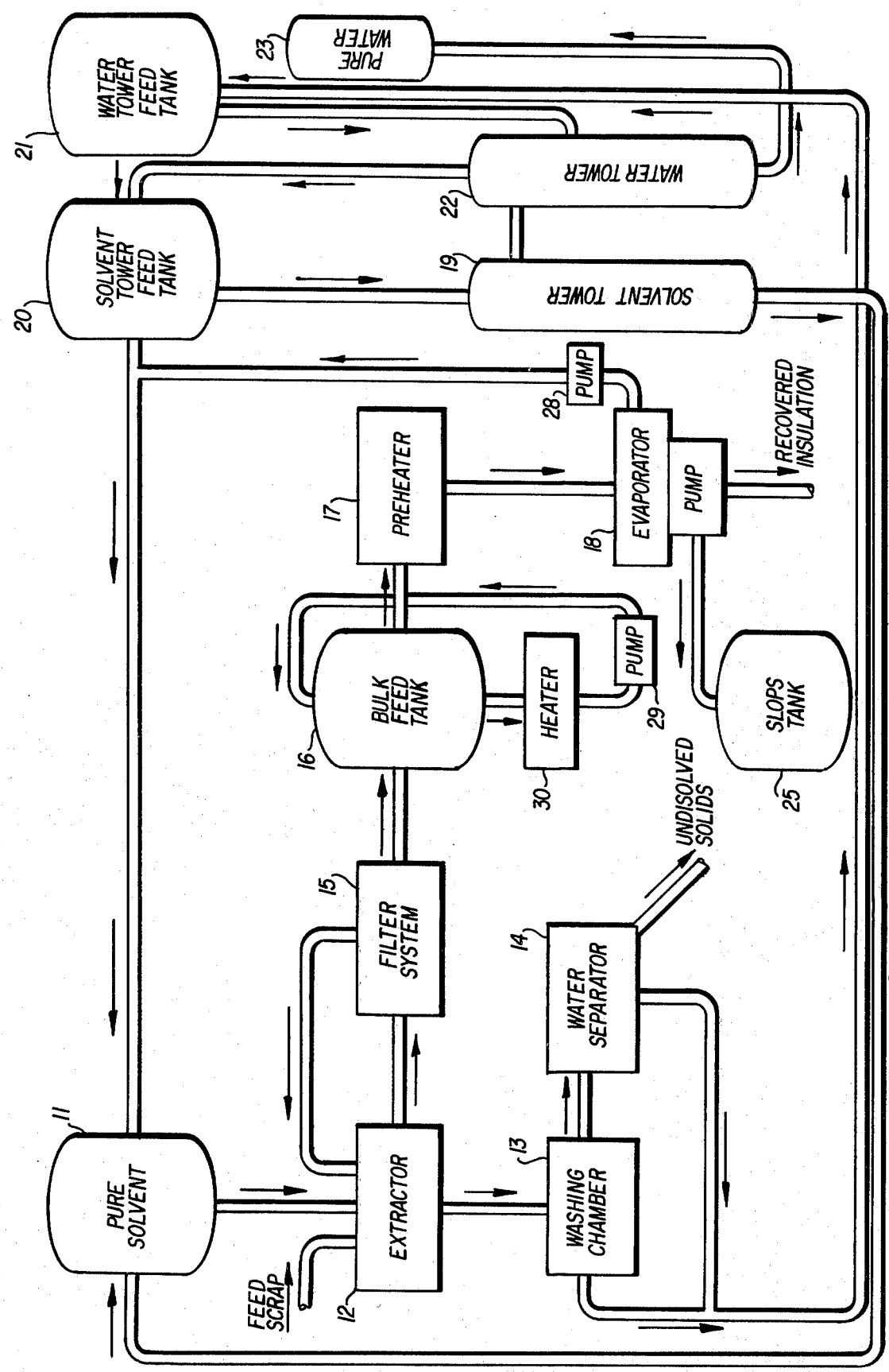

METHOD OF SELECTIVELY RECOVERING VINYL HALIDE INSULATION FROM INSULATED WIRE SCRAP

CROSS REFERENCE TO RELATED APPLICATIONS

This application is a continuation-in-part of copending application Ser. No. 407,396, filed Oct. 17, 1973, and now abandoned.

BACKGROUND OF THE INVENTION

This invention relates to a process for the recovery of metal and insulation in a usable form from an insulated wire scrap. In particular, this invention relates to a process for the selective recovery of specific insulating substances from insulated wire scrap made up of several insulation materials and metal.

Various techniques are common in the art of scrap recovery for removing insulation from insulated wire scrap, but with few exceptions most prior art recovery techniques such as: (1) Mechanical separation, as by abrasion or shearing; (2) Thermal separation, as by incineration of scrap to destroy the insulation, or the use of low temperature to imbrittle the insulation, with subsequent breaking or bending to remove the insulation from the wire; and (3) Chemical stripping of the insulation; and techniques which are primarily directed to the recovery of the conductor metal. Exemplary of the aforementioned techniques are U.S. Pat. Nos. 3,507,427 and 2,956,717, both of which disclose a combination of mechanical and thermal techniques for removing small selected portions of insulation from wire by first cooling the portion of a wire from which the insulation is to be removed to a low temperature and thereafter applying opposed cutting blades to the cooled insulation.

U.S. Pat. No. 3,635,454 is an example of the aforementioned high temperature techniques. Disclosed in U.S. Pat. No. 3,635,454 is a method whereby an organic insulation is subjected to a stream of hot nitrogen gas to affect the depolymerization of the insulation thereby removing the insulation from the conductor.

U.S. Pat. No. 3,666,691, Spiller, discloses a method which departs from the techniques previously discussed. The technique disclosed in Spiller is directed to the recovery of polyvinyl chloride resins from wire scrap by subjecting the resin containing scrap mixture to both the liquid and vapor phases of a solvent mixture in an autoclave and thereafter recovering the vinyl chloride insulation from solution by evaporation.

U.S. Pat. No. 3,624,009, Sussman, discloses a technique whereby polyvinyl chloride resin and fabric material are recovered from fabric material coated with polyvinyl chloride by contacting the coated fabric with a solvent under as inert water-free atmosphere to effectively dissolve polyvinyl chloride and the subsequent recovery of the dissolved polyvinyl chloride from solution by evaporation.

The past practices have almost universally emphasized techniques which either destroy the insulation and recover only the metal conductor or require expensive and time-consuming procedures to separate the various types of scrap to be processed by type of insulating material which is coated upon the conductor scrap. Although each of the aforementioned techniques may be useful for a particular application none of the prior techniques is suitable to be adapted to the continuous selective recovery of high volumes of insulation and metal from wire scrap containing a mixture of insulation materials. Also associated with the aforementioned techniques are numerous problems including: (1) chemical alteration of the insulation being treated which prohibits the reuse of the insulation so treated as a wire insulating material; (2) incorporation into the recovered metal of chemicals which are deleterious to standard metal refining processes; (3) the relatively high cost of the prior techniques; and (4) the production of undesirable pollutants such as smoke, hydrogen chloride, ash and the like which must be disposed of.

SUMMARY OF THE INVENTION

It is therefore a primary object of the present invention to provide a method which overcomes the aforementioned disadvantages of the prior art technique for removing insulation from scrap insulated wire.

It is another object of the present invention to provide a method of continuously removing the vinyl halide insulation from insulated wire scrap without adversely affecting the insulating qualities of the insulation.

It is yet another object of the present invention to provide a method for the selective recovery of vinyl halide insulation from insulated wire scrap wherein the insulated wire scrap contains numerous other organic insulation materials.

It is a further object of the present invention to provide a method of selectively recovering vinyl halide insulation suitable to be reused as electrical insulation from insulated wire scrap containing a combination of vinyl halide, polyolefins, rubber and other organic insulating materials.

Another object of the present invention is to provide a method of recovering vinyl halide insulation material from scrap insulated wire in fragmented small pieces for recycling into an extrusion coating device or the like for insulating wire.

A further object of this invention is to provide a method of recovering usable metal and usable vinyl halide insulation from scrap insulated wire which does not pollute.

Still another object of the present invention is to provide an electrical wire which comprises at least one insulated conductor and a jacket consisting of polyvinyl chloride insulation recovered by the method of the present invention.

The above and other objects of the present invention are carried out by a method which comprises contacting a mixture of insulated wire scrap which contains electrical conductor and polymeric insulation, a portion of the polymeric insulation being vinyl halide polymers with a counterflow of an organic solvent which will selectively dissolve the vinyl halide polymers; separating a solution of vinyl halide polymer from undissolved polymeric insulation and conductor scrap; recovering the vinyl halide polymer from solution in a form which can be extruded upon a wire as an electrical insulation; and reclaiming residual solvent from the undissolved portion of the wire scrap.

The rate of dissolution of the vinyl halide polymer is controlled by controlling the flow rate and temperature of the organic solvent and is independent of the degree of agitation to which the solvent is subjected. A motive force is applied to the scrap mixture for moving the scrap mixture counter to the direction of flow of the solvent but the movement imparted to the solids by this motive force is solely for the purpose of conveying the wire scrap from a solids inlet region of a conventional counter current extractor to a solids discharge region of the counter current extractor. Motive force is applied to the solvent flowing through the counter current extractor and the rate at which the solvent is propelled through the counter current extractor controls the rate at which vinyl halide polymer is dissolved from the insulated wire scrap solids.

Having in mind the above and other objects that will be evident from a reading of this disclosure, the present invention comprises the combinations and arrangements of parts and steps illustrated in the presently preferred embodiment of the invention which is hereinafter set forth in sufficient detail to enable those persons of ordinary skill in the art to clearly understand the function, operation, construction and advantages of it when read in conjunction with the accompanying drawing.

BRIEF DESCRIPTION OF THE DRAWINGS

FIG. 1 is a diagrammatic representation of the various steps which comprise the method of the present invention.

DESCRIPTION OF THE PREFERRED EMBODIMENT

For the purposes of illustration, the invention disclosed herein will be described in terms of a system in which tetrahydrofuran is the solvent; it being understood that the successful practice of the present invention is not limited to the particular solvent used to describe the preferred embodiment but in fact the invention can be successfully practiced using several solvents which under proper conditions are specific solvents for vinyl halide polymers. The term vinyl halide polymers is intended in this specification to means polymeric mixtures of polyvinyl chloride or copolymers of polyvinyl chloride having mixed and suspended within the polymer matrix one or more of the additives normally present in polyvinyl chloride electrical insulating compounds such as pigments, fillers, plasticizers and antioxidants.

Referring now in more detail to the drawing, in which like numerals indicate like parts throughout. The device will now be described as reference to FIG. 1 which depicts a process for selectively dissolving and recovering vinyl halide insulation material from a mixture containing many different types of electrical insulation material and metallic electrical conductor scrap.

Ideally, the starting material used for the practice of the present invention consists of a mixture of electrical wire scrap which comprises chopped metal conductors such as aluminum and aluminum alloys or copper and copper alloys and like conductive metals; compounds of polyvinyl chloride and copolymers of polyethylene propylene rubber, crosslinked polyethylene and other polymeric materials such as acrylic varnishes suitable for use as electrical wire insulation. The successful practice of the present invention is not dependent upon the relative concentrations of the above named materials in the mixture of insulated wire scrap from a technical standpoint, however it is dependent upon the relative concentration of these materials if the practice of the present invention is to be economically successful. The present invention may also be successfully practiced without first treating scrap mixture to remove water contained therein. Also it is not necessary to carry out the extraction step of the present invention in a closed extractor under an inert atmosphere.

Suitable chopped vinyl scrap enters the extractor 12 where it is contacted with a counter current flow of a solvent at a temperature at which the solvent selectively dissolves the vinyl halide polymers present in the scrap, especially the vinyl halide polymer, PVC and copolymers of PVC. In one embodiment of the present invention the solvent which is being pushed in a direction opposite the direction of movement of the chopped scrap is pre-heated to a temperature of from about 68°F to about 130°F before being pumped into extractor 12 wherein it contacts the chopped scrap mixture and vinyl halide polymers contained in the mixture are dissolved. The insoluble solids which remain after the chopped wire scrap is contacted with the pre-heated solvent are conveyed into a washing chamber 13 where they are again contacted in a counter current relationship with water to remove any residual organic solvent retained therein. The insoluble solids (polypropylene, polyethylene, copper, aluminum, etc.) are then conveyed into a liquid separator 14 wherein the water and residual solvent are separated from the undissolved solids solvents.

The solvent-water stream (5 to 20% solvent) from the washing chamber 13 is pumped to water tower feed tank 21. The undissolved solids discharged from the water washing chamber 13 contains a high percentage of metal, polypropylene, polyethylene, crosslinked polyethylene, and any other non vinyl halide polymers which might have been present in the original mixture of insulated wire scrap. The undissolved solids as discharged from washer 13 are ideal feed material for a copper fire refining process or may be further treated by pyrolysis prior to introduction into the metal recovery furnace, if powdered feed material for the furnace is desired.

The vinyl halide solution, which may contain from 0.01 to about 25 percent vinyl halide insulation, is next series filtered through filter system 15 to remove any residual solids which might have been carried out of the extractor 12 because of their small size. Larger particles are removed by first filtering with coarse mechanical filters and smaller particles are removed with a 25 micron fines filter. Material collected by the filter system can then either be conveyed directly to a metal recovery furnace or recycled to extractor 12 if organic halides are present in substantial quantities. The vinyl halide insulation solution is then pumped into bulk feed tank 16, which feeds preheater 17.

One important aspect of the present invention is the necessity of maintaining a homogeneous solution of vinyl halide insulation material during recovery of the vinyl halide insulation from solution. This is accomplished by constantly circulating the vinyl halide solution collected in bulk feed tank 16 through tank heater 30 thereby maintaining a homogeneous solution of vinyl halide insulation material and simultaneously raising the temperature of the solution to about 100°F, when the solvent is tetrahydrofuran or N-methylpyrrole. The vinyl halide insulation solution is then fed to evaporator 18. As the vinyl halide solution is fed to evaporator 18 it passes through preheater 17 where the temperature of the solution is raised to about 120°F if the solvent used is either tetrahydrofuran or N-methylpyrrole. Ideally evaporation of the solvent and the resulting recovery of the vinyl halide insulation occurs in a thin film evaporator at a pressure of from about 0.2 to 0.9 atmosphere and at a temperature of from about 90°F to about 300°F. The temperature and pressure used to effect evaporation of the solvent from the vinyl halide insulation solution will depend upon the antioxidant concentration in the vinyl halide insulation and the solvent used to dissolve the vinyl halide insulation, in that the higher the antioxidant concentration in the insulation the higher the solvent temperature may be. Recovered vinyl halide insulation (nominally 99 percent solids) is discharged from evaporator 18 in a substantially dry state through a product outlet pump, 24. A slops tank, 25, is provided for use during start-ups and for flushing the evaporator.

The solvent vapor, which is produced in evaporator 18 and contains nominally about one percent water, is conveyed as a liquid to solvent tower feed tank 20 and pure solvent storage tank 11. Generally the stream is split 50—50 between the two tanks. Any water picked up by the solvent from the metallic scrap-insulation mixture is removed in solvent tower 19. The one percent water solvent stream is blended with the overhead stream from water tower 22 (from about 4.1 to about 7.1 percent water) resulting in a feed for solvent tower 19 containing approximately 3.9 percent water. This material is pressure distilled to produce a solvent stream containing about 0.32 percent water which is stored in pure solvent storage tank 11 for use in extractor 18.

The solvent-water wash stream from water wash chamber 13 which contains approximately (9) percent solvent is blended with the overheads from solvent tower 19 which contain approximately 11.7 percent water in water tower feed tank 21, resulting in a water tower feed composition which is approximately 84.5 percent water. Water tower 22 operates at a pressure of 1 atmosphere to produce a product water which contains about 0.043 percent solvent which after the distillation is stored in pure water storage tank 23 for reuse in the process. The overheads from water tower 22 are stored in solvent tower feed tank 20 for subsequent redistillation.

The extraction portion of the method will now be described assuming that a chopped insulated wire scrap consisting of copper metal, polyvinyl chloride, polyethylene, crosslinked polyethylene, ethylene propylene rubber, polypropylene, teflon and nylon is continuously metered into extractor 12 and moves at a predetermined rate from the vicinity of a solution discharge outlet to a solids discharge outlet during which time it is continuously contacted with a counter current flow of a solvent at a temperature at which the solvent is a specific solvent for the polyvinyl chloride insulation. Representative of the solvents which may be used in the practice of the present invention are tetrahydrofuran, N-methylpyrrole, methylethylketone, cyclohexanone, dimethylformamide, N-methylpyrrolidone and mixtures thereof. Tetrahydrofuran functions as a selective solvent for polyvinyl chloride at a temperature of from about 68°F to about 110°F preferably when the temperature of the tetrahydrofuran is from about 68°F. When N-methylpyrrolidone is the solvent used in the process of the present invention the desired results are obtained at a temperature of from about 170°F to about 220°F, with the most preferred results being obtained within the temperature range of from about 195°F to about 220°F. When the solvent cyclohexanone is used in the process of the present invention satisfactory solution rates are obtained when the temperature is from about 200°F to about 285°F with preferred solution rates being obtained between the temperatures of from about 260°F to about 280°F. When the solvent dimethylformamide is used in the present invention acceptable results are obtained at a temperature of from about 150°F to about 195°F with the preferred results being obtained at a solvent temperature of from about 175°F to about 195°F. When methylethylketone is used as the solvent in the present invention acceptable results are obtained with a solvent temperature of from about 140°F to about 180°F with best results being obtained when the solvent temperature is from about 150°F to about 170°F. N-methylpyrrole is a satisfactory solvent for use in the present invention when the solvent temperature is from about 90°F to about 120°F.

The concentration of the polyvinyl chloride solution is controlled by controling the temperature of the solvent, solvent flow rate and flow rate of the insulated wire scrap. Advantageously the extraction portion of the process of the present invention is carried out at one atmosphere pressure and under no specialized atmosphere. Preferably the extractor 12 is closed to the outside atmosphere, the reason for closing the extractor however, is economic rather than technical, in that as solvent losses are decreased the profits derived from the present invention increase. Advantageously the solution discharged from extractor 12 has a concentration of dissolved polyvinyl chloride insulation of from about 8 to about 17 percent for all solvents, however the preferred concentrations for different solvents may vary.

The following Examples are intended as further illustration of the present invention but are not necessarily limitive except as set forth in the claims. All parts and percentages are by weight unless otherwise indicated.

EXAMPLE I

Chopped wire scrap consisting of metallic copper, polyvinyl chloride, polyethylene, cross linked polyethylene, nylon, teflon and polypropylene was introduced into a Gifford-Wood counter-current extractor operating at atmospheric pressure. The extractor was arranged so that the scrap mixture moved from the scrap inlet toward the undissolved solids outlet at a fixed rate. As the scrap moved through the extractor it was continuously contacted with a counter-current flow of tetrahydrofuran heated to a temperature of 88°F ± 3°F. The heated tetrahydrofuran was introduced into the extractor through the solvent inlet located in the vicinity of the undissolved solids outlet and the flow rate was adjusted to maintain a 14.6 ± 1 percent by weight solution of polyvinyl chloride when measured at the solution discharge outlet. The polyvinyl chloride solution was filtered using a Cuno mechanical filter for rough filtration and a series of 25 micron polypropylene cartridge filters for fine filtration. The filtered polyvinyl chloride solution was then preheated to 120°F before being pumped into a thin film evaporator where dry fragmented polyvinyl chloride and clear tetrahydrofuran were recovered. The tetrahydrofuran was recycled by standard distillation means for reuse in the extractor, as was the water solution from the undissolved solids. The recovered polyvinyl chloride was then packaged for subsequent use in an extrusion process for insulating electrical wire and cable and the undissolved solids were packaged for subsequent use in an extrusion process for insulating electrical wire and cable and the undissolved solids were packaged for subsequent use as raw material feed in a fire refining process for reclaiming copper.

Identical procedure and equipment were used in Examples 2–19, however operating conditions were varied according to solvent used as can be seen by examining Table I.

EXAMPLE 2 – 19

The procedure of Example 1 was repeated in all essential respects except that several PVC specific solvents and PVC nonsolvents were used. The operating temperature used was varied according to the solvent used.

ing polyvinyl chloride. The material used in this extrusion process has been processed through standard granulating means merely for the purpose of giving the material a uniform particle size and thereby improving its solid flow characteristics so that an even feed rate of the dry recovered polyvinyl chloride insulation into the extruder could be attained. The recovered polyvinyl chloride insulation had not received additional treatment to include addition of new plasticizers or stabilizers prior to or during extrusions. Black pigment was added at the extruder to improve the color of the final extruded product. Table III reflects the physical properties of the extruded recovered material as compared to minimum acceptable tensile strength and ultimate elongation requirements for an Underwriters Labora-

TABLE I

| SOLVENT | | SOLVENT TEMP °F | SOLVENT FEED RATE | SOLIDS FEED RATE | PERCENT PVC SOLUTION | PERCENT VINYL HALIDE REMAINING IN SOLIDS |
|---|---|---|---|---|---|---|
| 2. | Tetrahydrofuran | 81 | 167.8 pph | 42 pph | 14.1 | 0.18 |
| 3. | Tetrahydrofuran | 82 | 178.27 | 19.9 | 9.7 | 0.20 |
| 4. | Tetrahydrofuran | 82 | 97.13 | 9.8 | 7.8 | 0.20 |
| 5. | Tetrahydrofuran | 82 | 75.65 | 17.35 | 16.8 | 0.05 |
| 6. | N-methylpyrrole | 100 | 170 pph | 45 pph | 14.6 | 0.08 |
| 7. | N-methylpyrrole | 110 | 180 pph | 20 pph | 11.0 | 0.08 |
| 8. | Methylethylketone | 160 | 160 pph | 40 pph | 8.0 | 0.09 |
| 9. | Methylethylketone | 150 | 97 pph | 10 pph | 6.0 | 0.10 |
| 10. | Methylethylketone | 170 | 75 pph | 18 pph | 10.0 | 0.12 |
| 11. | Cyclohexanone | 270 | 160 pph | 40 pph | 8.5 | 0.17 |
| 12. | Cyclohexanone | 275 | 97 pph | 10 pph | 6.5 | 0.14 |
| 13. | Cyclohexanone | 280 | 180 pph | 20 pph | 10.00 | 0.12 |
| 14. | Methylene Chloride | 110 | does not dissolve - high solvent loss | | | 98+ |
| 15. | Methylene Chloride +10% dimethyl formamide | 110 | does not dissolve - high solvent loss | | | 98+ |
| 16. | Dimethylformamide | 192 | 75 | 17 | 16.0 | 0.10 |
| 17. | Methylbutylketone | 160 | does not dissolve | | | 98+ |
| 18. | Methylbutylketone | 218 | does not dissolve | | | 98+ |
| 19. | N-methylpyrrolidone | 210 | 167 | 42 | 14.6 | 0.11 |

Table II illustrates the effect of the various solvents used in Examples 1 – 19 on polymeric insulation material other than polyvinyl chloride present in the insulated wire scrap mixture treated by the process of the present invention. From a reading of Table II it will be readily apparent that for the operating conditions that the solvent and process are selective for polyvinyl chloride and copolymers thereof.

TABLE II

| | Solvent | Solvent Temp °F | %Organics Not Vinyl Halide in Solution |
|---|---|---|---|
| 1. | Tetrahydrofuran | 82 | 0, slight swelling polyethylene |
| 2. | N-Methylpyrrole | 100 | 0, some swelling polyethylene and polypropylen |
| 3. | methylethylketone | 160 | 0, some swelling polyethylene, polypropylene, nylon, and ethylene propylene rubber |
| 4. | cyclohexanone | 270 | 0, some swelling and softening all polymers |
| 5. | methylenechloride | 110 | 0, general softening and swelling all polymers |
| 6. | dimethylformamide | 192 | 0, general softening and swelling all polymers |
| 7. | methylbutylketone | 218 | 0, general softening and swelling all polymers |
| 8. | N-methylpyrrolidone | 210 | 0, general softening and swelling all polymers |

Example 20

Polyvinyl chloride insulation recovered from the insulated wire scrap mixture described in Example 1 was extruded as insulation on a Number 10 AWG copper wire using standard industry techniques for extrudries approved polyvinyl chloride jacket compound.

TABLE III

| Property | Reclaimed PVC Compound | Virgin PVC U.L. Approved Jacket Compound |
|---|---|---|
| Specific gravity | 1.41 | |
| Hardness; Durometer, A | 86 | |
| Ultimate Tensile Strength, psi | 2857 | 1500 |
| Ultimate Elongation, % | 305 | 150 |

The data in Table III indicates that plasticizers and fillers not removed from the polyvinyl chloride by the extraction process of the present invention.

The invention has been described in conjunction with one particular embodiment and it is to be understood that obvious modifications and changes may be made without departing from the spirit and scope of the invention as defined in the appended claims and the invention is intended to cover all such modifications and changes which fall within the scope of the claimed invention.

What is claimed is:

1. A process for the continuous selective recovery of polyvinyl halide insulation selected from the group consisting of polyvinyl chloride, copolymers of polyvinyl chloride and mixtures thereof, from mixed insulated wire scrap, said mixed insulated wire scrap comprising wire scrap with mixtures of said polyvinyl halide and at least one insulation selected from the group consisting of polyethylene, crosslinked polyethylene, ethylene propylene rubber, polypropylene, teflon and nylon, comprising the steps of:
   a. selectively dissolving polyvinyl halide insulation from the mixed insulated wire scrap with a solvent at a temperature at which the solvent is a specific solvent for the polyvinyl halide insulation and at which temperature the solvent has substantially no solvent effect upon other insulations present in the mixed insulated wire scrap;
   b. separating the undissolved portion of the insulated wire scrap from the dissolved polyvinyl halide insulation; and
   c. maintaining a homogeneous solution of polyvinyl halide while recovering the dissolved polyvinyl halide from solution in a dry granular state suitable for extrusion upon wire.

2. The process of claim 1 wherein steps (a) and (b) comprise the additional steps of:
   a. providing a countercurrent extractor having at least one extraction chamber and at least one washing chamber;
   b. supplying the mixed insulated wire scrap, and water to the countercurrent extractor;
   c. simultaneously moving the mixed insulated wire scrap through the at least one extraction chamber of said countercurrent extractor and contacting the mixed insulated wire scrap with a countercurrent flow of the solvent to effect said selective dissolving of polyvinyl halide insulation;
   d. discharging a solution consisting of dissolved polyvinyl halide insulation from the extraction chamber of the countercurrent extractor;
   e. transferring the undissolved portion of the mixed insulated wire scrap from the extraction chamber into the washing chamber; and
   f. contacting the undissolved portion of the mixed insulated wire scrap from the extraction chamber with a countercurrent flow of water to remove substantially all residual solvent retained therein.

3. The process of claim 1 wherein said recovering comprises evaporating the solvent from said solution in an evaporator at a temperature and pressure at which the solvent will evaporate from said solution without thermally degrading the polyvinyl halide insulation and discharging dry polyvinyl halide insulation suitable for reuse from the evaporator.

4. The process of claim 1 further including the steps of granulating said recovered polyvinyl halide insulation and extruding said polyvinyl halide insulation upon wire.

5. The process of claim 1 wherein said solvent is selected from a group consisting of tetrahydrofuran, N-methylpyrrole, methylethylketone, cyclohexanone, dimethylformamide, N-methylpyrrolidone and mixtures thereof.

6. The process of claim 1 wherein said solvent is tetrahydrofuran heated to a temperature of from about 68°F to about 110°F.

7. The process of claim 1 wherein said solvent is tetrahydrofuran heated to a temperature of from about 68°F to about 91°F.

8. The process of claim 1 wherein said solvent is N-methylpyrrolidone heated to a temperature of from about 170°F to about 220°F.

9. The process of claim 1 wherein said solvent is N-methylpyrrolidone heated to a temperature of from about 195°F to about 200°F.

10. The process of claim 1 wherein said solvent is cyclohexanone heated to a temperature of from about 200°F to about 285°F.

11. The process of claim 1 wherein said solvent is cyclohexanone heated to a temperature of from about 260°F to about 280°F.

12. The process of claim 1 wherein said solvent is dimethylformamide heated to a temperature of from about 150°F to about 195°F.

13. The process of claim 1 wherein said solvent is dimethylformamide heated to a temperature of from about 175°F to about 195°F.

14. The process of claim 1 wherein said solvent is methylethylketone heated to a temperature of from about 140°F to about 180°F.

15. The process of claim 1 wherein said solvent is methylethylketone heated to a temperature of from about 150°F to about 170°F.

16. The process of claim 1 wherein said solvent is N-methypyrrole treated to a temperature of from about 90°F to about 120°F.

17. The process of claim 1 wherein said mixed insulated wire scrap comprises a mixture of copper and aluminum metals in combination with said mixtures of insulation.

18. The process of claim 17 wherein the solvent is selected from a group consisting of tetrahydrofuran, N-methylpyrrole, methylethylketone, cyclohexanone, dimethylformamide, N-methylpyrrolidone and mixtures thereof.

19. A process for the continuous selective recovery of polyvinyl chloride insulation from mixed insulated wire scrap comprising the steps of:
   a. providing a countercurrent extractor;
   b. supplying mixed insulated wire scrap, a solvent at a temperature at which the solvent is a specific solvent for polyvinyl chloride insulation and at which temperature the solvent has substantially no solvent effect upon other insulations present in the mixed insulated wire scrap, and water to the countercurrent extractor;
   c. moving the mixed insulated wire scrap through said countercurrent extractor while contacting said mixed insulated wire scrap with a countercurrent flow of the solvent at the temperature at which the solvent is a specific solvent for the polyvinyl chloride insulation to dissolve the polyvinyl chloride insulation;
   d. discharging said dissolved polyvinyl chloride insulation from said countercurrent extractor leaving therein an undissolved portion of said mixed insulated wire scrap;

e. maintaining a homogenous solution of polyvinyl halide while reclaiming said dissolved polyvinyl chloride insulation from solution in a form suitable for extrusion upon a wire;

f. washing said undissolved portion with water to remove residual solvent from said undissolved portion; and g. recovering the solvent from steps (e) and (f) for subsequent reuse in step (b).

* * * * *